Patented Aug. 19, 1947

2,425,768

UNITED STATES PATENT OFFICE 2,425,768

DRILLING FLUIDS AND METHOD OF USE

Cary R. Wagner, Utica, Ohio, assignor to Phillips Petroleum Company, a corporation of Delaware No Drawing. Application August 12, 1944, Serial No. 549,299

12 Claims. (Cl. 252—8.5)

This invention relates to water base drilling muds containing water soluble alkali metal carboxymethylcellulose. In some aspects it relates to drilling fluids suitable for drilling in heaving shale. In still other aspects it relates to drilling fluids having a high salt content, due either to deliberate addition of salt, or due to contamination of the mud with salt from natural formations or from connate waters. It also relates to methods of drilling or controlling wells with such fluids.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations in the well. In order to perform these important functions properly the drilling mud must have suitable viscosity and other qualities at all times in spite of adverse conditions encountered in drilling the well.

In drilling wells there are two major difficulties caused by natural formations penetrated. The first of these difficulties is that if salt is encountered the salt will cut ordinary drilling mud so that its viscosity is entirely too high, the clay particles are deflocculated, and there is grave danger of the drilling pipe twisting in half or of gas cutting or a blowout occurring due to the salt cutting of the mud. The other difficulty encountered is that when a formation known as heaving shale is penetrated, this heaving shale absorbs water from the drilling mud and by a caving or disintegration action common to clay and shale, or by a swelling action common to bentonite materials, the well hole is closed around the drill string choking off the circulation of drilling mud and often seizing the drill string so that the drill string twists in half.

The principal object of my invention is to produce a drilling mud which can be used not only in ordinary formations but which will resist contamination by salt and which will not cause heaving shale or similar formations to cave or swell.

Another object is to provide an improved drilling mud.

Another object is to provide an improved method of drilling.

A further object is to provide a drilling mud containing a water soluble alkali metal carboxymethylcellulose.

Another object is to provide a drilling mud containing a water soluble alkali metal carboxymethylcellulose and a salt.

Another object is to provide a method of drilling suitable in ordinary formations, in salt containing formations and in formations tending to cave or heave.

Numerous other objects and advantages of the invention will be apparent to those skilled in the art upon reading the following specification and the accompanying claims.

Operation

In the present invention I prefer to employ as a colloidal suspending agent or dispersing agent in a drilling mud a water soluble alkali metal carboxymethylcellulose. The amount of water soluble alkali metal carboxymethylcellulose employed is not critical as even small amounts give a corresponding smaller effect. I have found in the case of sodium carboxymethylcellulose that four pounds of dry powdered water soluble alkali metal carboxymethylcellulose per 42 gallon barrel gives a satisfactory and economical mixture. However, much less or much more of the water soluble alkali metal carboxymethylcellulose may be employed and still the advantages of my invention will be achieved to a greater or lesser extent.

The water soluble alkali metal carboxymethylcellulose may be in dried powder form, the particles size not being critical. However for rapid solution a particle size where 95% will pass an 80 mesh screen is useful. In the case of some slowly water soluble alkali metal carboxymethylcelluloses, or to speed up the solution of any water soluble alkali metal carboxymethylcellulose, any suitable wetting agent may be added first, such as alcohol.

In rotary drilling the methods consist in adding the water soluble alkali metal carboxymethylcellulose powder, which may be added to the drilling fluid flowing in the mud ditch to the pump intake; or to the mud pit; by scattering the powder over the surface. An alternative method would be make up a more or less concentrated solution of the water soluble alkali metal carboxymethylcellulose and add that in a steam to the drilling mud. In some instances a pure mixture of water and water soluble alkali metal carboxymethylcellulose may be used as the well drilling or well controlling fluid, but mud is generally added. The drilling fluid containing the water soluble alkali metal carboxymethylcellulose and water is pumped in circulation or reverse circlulation in the drill string or used to fill or partially fill the well in the usual operations of well drilling and well controlling of the prior art. When the water soluble alkali metal carboxymethylcellulose is so used in sufficient amount a new result is achieved in that salt water does not cut the mud qualities enough to harm it for drilling and formations exposed to it do not cave or heave enough to stop the drilling. Suitable control or mud treating agents may be used, such as phosphates and/or quebracho if desired.

I have found that water soluble alkali metal carboxymethylcelluloses, such as sodium carboxymethylcellulose, potassium carboxymethylcellulose and lithium carboxymethylcellulose give excellent results in water base drilling mud as stated herein, the various alkali metal carboxymethylcelluloses having quite similar similar effects on the water base mud.

Any use of a water soluble alkali metal carboxymethylcellulose to be retained as a soluble dispersing agent throughout the entire normal life of the drilling mud is not to be confused with the use of some alkali or acid soluble cellulose which is to be precipitated as an insoluble plugging agent in the formation. I do not use my water soluble alkali metal carboxymethylcellulose as a plugging agent at all, and while calcium ions present in a connate water in a subterranean formation may form a colloidal haze of supposedly insoluble calcium carboxymethylcellulose salts and while this colloidal calcium carboxymethylcellulose may contact the formation, such colloidal material is not comparable to the immediate precipitation of relatively massive insoluble plugging material formed by alkali or acid soluble celluloses upon removal or dilution of the alkali or acid. The haze of calcium carboxymethylcellulose formed from water soluble alkali metal carboxymethylcelluloses is colloidal and does not precipitate under ordinary conditions.

The mode or theory of operation by which the soluble alkali metal carboxymethylcelluloses protect the surface of clay or bentonite from attack by water is obscure, but it is believed that as the water attempts to enter the clay the water soluble alkali metal carboxymethylcellulose forms a layer of a protective material on the outside of the clay or bentonite preventing the clay or bentonite from absorbing the water from the drilling mud.

Drilling muds containing water soluble alkali metal carboxymethylcellulose are not subject to injury by salt to any detrimental degree but may still be useful as drilling muds when there is as much in some instances as 238,000 parts per million of sodium chloride in the drilling mud or more.

Water soluble alkali metal carboxymethylcellulose containing drilling muds often have low initial gel strength which allows gas bubbles to come out of the drilling mud so rapidly that the drilling mud will not become gas cut. Elimination of gas cutting reduces the chances of blowouts. Water soluble alkali metal carboxymethylcellulose drilling muds are often characterized by very thin filter cake thickness and by very small water loss or complete absence of water loss. This is very useful in avoiding loss of water to the formation, as well as the resultant swelling or caving of the formation which occurs with some formations. They do not generally ferment or spoil. Numerous other advantages of soluble alkali metal carboxymethylcellulose drilling muds will be apparent from a study of the following representative experiments which have been selected to show in a minimum of space the advantages of water soluble alkali metal carboxymethylcellulose drilling muds.

Tests

The tests of the properties of solutions of water soluble alkali metal carboxymethylcelluloses and/or drilling muds were all made with standard drilling mud laboratory equipment.

The measurements of pH were all made with a Beckman "Industrial Model M" pH meter. The viscosity measurements were all made with a Stormer viscosimeter 1931 model made by Arthur H. Thomas Company. The mixing of samples was always for 15 minutes with a Hamilton Beach No. 33 high speed mixer. Sodium chloride content was calculated from a determination of the chlorine ions by titration with silver nitrate using a potassium chromate indicator. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

Example A

In order to demonstrate the value of water soluble alkali metal carboxymethylcelluloses in drilling muds in as brief a manner as possible the following experiment is chosen as representative. Note that this experiment shows the high value of such water soluble alkali metal carboxymethylcelluloses under the adverse condition of salt contamination and in competition with the starch type drilling mud additive used at present for control of salt cut mud in the field.

A drilling mud was prepared using a good local fire clay and having characteristics suitable for use as a drilling mud as follows:

Typical drilling mud

| | |
|---|---|
| Weight | 10.10 pounds per gallon |
| Viscosity-Stormer | 7.0 centipoises |
| Initial gel strength | 8.0 grams |
| 10 minute gel strength | 50. grams |
| Water loss | 25.6 cubic centimeters |
| Filter cake thickness | 4/32 inch |
| Sodium chloride content | 4,800 parts per million |
| pH | 7.95 |
| Free water on top surface | None |
| Appearance | Smooth, homogeneous |

This typical drilling mud was heavily salted, to an extreme of salt contamination and a remarkable change occurred in its appearance. The salt cut mud after mixing looked frothy, full of gas bubbles, cracks and water bubbles. It had an uneven texture and the tests as to viscosity, water loss, and filter cake thickness and other tests all showed this salt cut mud to be entirely unsuitable for use as a drilling mud as follows:

Same drilling mud salt cut

| | |
|---|---|
| Weight | 10.70 pounds per gallon |
| Viscosity-Stormer | 33. centipoises |
| Initial gel strength | 82 grams |
| 10 minute gel strength | 90 grams |
| Water loss | 68 cubic centimeters |
| Filter cake thickness | 10/32 inch |
| Sodium chloride content | 238,000 parts per million |
| pH | 7.7 |
| Free water on top surface | Some |
| Appearance | Frothy, cracked, uneven |

If this change due to salt cutting had occurred in a drilling well, the high viscosity would have reduced or stopped the circulation of mud, the bit and lower drill stem would have been seized and the drill pipes twisted in half. Other dangers, such as gas cutting of the mud or blowouts would occur in some instances.

This same salt cut drilling mud was then divided into two portions and to the first portion was added a water soluble alkali metal carboxymethylcellulose, namely sodium carboxymethylcellulose, the amount being four pounds of dry cellulose powder per barrel of said salt cut drilling mud. After mixing the usual time a remarkable change occurred in its appearance. No gas nor water bubbles were left, which lack of gas increased the weight per gallon appreciably. The mud was homogeneous and smooth again, and drops of mud falling back into the mud from a pencil dipped therein gave typical dispersion rings. (These rings were not present before adding the water soluble alkali metal carboxymethylcellulose.

This salt cut and water soluble alkali metal carboxymethylcellulose restored drilling mud was again suitable for use in the drilling of wells and had the following properties:

*Water soluble alkali metal carboxymethylcellulose restored salted mud*

Weight_____ 10.95 pounds per gallon
Viscosity-Stormer_____ 20 centipoises
Initial gel strength_____ 1.0 gram
10 minute gel strength_____ 10 grams
Water loss_____ 5.0 cubic centimeters
Filter cake thickness_____ $\frac{1}{32}$ inch
pH_____ 7.82
Free water on top surface. None
Appearance_____ Smooth, homogeneous The water soluble alkali metal carboxymethylcellulose powder alone, four pounds to the barrel of water, gave a colorless transparent viscous liquid of 9 centipoises viscosity-Stormer and a pH of 4.3.

Taking the other portion of the same salt cut drilling mud, four pounds of dry starch (of the well known brand used at present in the oil fields for controlling salt cut drilling mud) was added per barrel of drilling mud. After mixing the same length of time, there was not complete restoration of the mud (as was the case with the water soluble alkali metal carboxymethylcellulose restored mud). The starch restored mud was full of gas bubbles and some water bubbles. It did not look homogeneous and had the following properties, which while probably suitable for drilling wells show it to be inferior to the water soluble alkali metal carboxymethylcellulose restored drilling mud:

*Starch restored salted mud*

Weight_____ 9.25 pounds per gallon
Viscosity-Stormer_____ 20 centipoises
Initial gel strength_____ 19 grams
10 minute gel strength_____ 80 grams
Water loss_____ 12 cubic centimeters
Filter cake thickness_____ $\frac{3}{32}$ inch
pH_____ 7.8
Free water on top surface Some
Appearance_____ Gas bubbles, uneven Note how light the starch restored salted mud is, 9.25 pounds per gallon. This is due to the gas bubbles noted, which in turn are due to the excessive initial gel strength of 19 grams. Compare the original initial gel strength of 8 grams, and the improved low initial gel strength of one gram for water soluble alkali metal carboxymethylcellulose restored mud. Compare the weight per gallon. Obviously the water soluble alkali metal carboxymethylcellulose restored mud cannot become gas cut and yet the 10 minute gel strength is sufficient to support the cuttings when circulation is interrupted in a well during rotary drilling. The usual organic colloid, starch or gum mud has to be watched carefully for gas cutting.

Note the low water loss and thin filter cake of the water soluble alkali metal carboxymethylcellulose restored mud. This is important in drilling heaving shale, and in all formations where water loss is likely. The thickness of filter cake is not all. The mud cake of the salt cut mud is thick, rough and contains pock marks, holes and other indications of porosity. It almost fell from the filter paper in large pieces leaving the paper clean. The starch restored salt mud cake was thinner but still rough, had pock marks and the cake scraped off easily in a sheet, leaving the paper clean. The water soluble alkali metal carboxymethylcellulose restored salt mud cake was thin, even, soft and adhered to the paper and could not all be removed with a knife, but left the paper dirty. Thus the water soluble alkali metal carboxymethylcellulose containing filter cake is quite superior for all well drilling purposes.

EXAMPLE B

Samples of such muds as the starch restored and water soluble alkali metal carboxymethylcellulose restored muds mentioned above in Example A were left to stand for 6 months. Some of each were contaminated with sour mud (fermented starch mud) others merely exposed to the air.

The starch containing muds all fermented and went sour, becoming flocculated or otherwise worthless as drilling mud in a period of some days, the contaminated ones fermenting almost at once, the uncontaminated ones fermenting several days later. None of the water soluble alkali metal carboxymethylcellulose containing muds fermented, even after six months regardless of contamination and exposure to the air. It is possible some organism could attack them successfully, but water soluble alkali metal carboxymethylcellulose containing muds are much more resistant than starch containing muds.

EXAMPLE C

In order to test the effect of water soluble alkali metal carboxymethylcelluloses on natural formations, such as heaving shale, a series of tests were made. Using some more of the same sodium carboxymethylcellulose and making up transparent mixtures most easily compared to the mixtures employed in Examples A and B above, the following results were obtained:

Small beakers were set in rows. In each one of beakers numbered 1, 2, 3, 4, 5 and 6 were placed large single pieces of a lower Pennsylvanian fireclay of the kaolin type.

In 1 was poured a solution of 4 pounds of sodium carboxymethylcellulose per barrel of distilled water.

In 2 was poured a solution of 2 pounds of sodium carboxymethylcellulose per barrel of distilled water, the water used weighing 41 grams, and to which 4 grams of calcium chloride was added. Before pouring over the clay this mixture was kept overnight in a bottle and a white haze of colloidal material formed which did not cut down the transparency of the solution to any substantial extent. A sample of this hazy solution kept for two weeks showed no tendency to precipitation although shaken several times. The haze was probably calcium carboxymethylcellulose in colloidal form.

In 3 was poured distilled water.

In 4 was poured a solution of 4 pounds of sodium carboxymethylcellulose per barrel of distilled water, the water used weighing 40 grams and to which 12.5 grams of sodium chloride was added making a transparent solution having about 238,000 parts per million of sodium chloride. This solution is comparable in water soluble alkali metal carboxymethylcellulose content and in salt content with the "water soluble alkali metal carboxymethylcellulose restored salted mud" in Example A above, and should react with the piece of clay the same as such mud would, the only difference being in more clay being present in the mud to hide any view of the large piece of the same type clay in the beaker.

In 5 was poured a solution of 12.5 grams of sodium chloride in 40 grams of distilled water as a check on 4.

In 6 was poured a solution of 4 grams of calcium chloride in 41 grams of distilled water as a check on 2.

The reaction with the clay took place fastest in the salt solutions 5 and 6, the lumps of fireclay immediately and rapidly disintegrating into very minute pieces in less than 2 minutes but the solution remaining clear.

The reaction in 3 with water started immediately the clay breaking up fast and a dirty cloud of semi-opaque matter forming. In fifteen minutes the clay was a layer of mud covered by muddy water.

The reaction in 1 and 2 was very slight. Some bubbles formed very slowly on the clay lumps and after a half an hour the lumps had split into four or five large pieces each. The solution remained clear, although 2 retained its original white haze. Further change ceased and 1 and 2 appeared the same after 3 hours. Sodium carboxymethylcellulose protected the clay from disintegration.

There was substantially no reaction in 4. The combination of water soluble alkali metal carboxymethylcellulose and salt was most effective. After one hour it was noted the lump of clay was breaking in four or five large pieces, but this was not completed after three hours. The clay was almost fully protected.

EXAMPLE D

In each of beakers 7, 8, 9, 10, 11, 12 and 13 was placed some granulated dry bentonite, known commercially as "Jelox."

The solutions poured into beakers 7 and 12 were respectively the same as poured into beakers 1 to 6 respectively in Example C above.

Beaker 13 contained a super saturated solution of sodium carboxymethylcellulose and about 4 grams of calcium chloride in 41 grams of distilled water.

The reaction in 9 with distilled water was instantaneous. The bentonite heaved or swelled up as rapidly as the water was added forming a gelatinous mass of 11 times the original size.

In 11 with salt water a slight swelling of very limited extent made the mass about 1.05 times as large as originally in about 10 minutes at which time action ceased, no further change being visible in 3 hours.

In 7 with the water soluble alkali metal carboxymethylcellulose and water solution a slight swelling made the mass about 1.12 times as large in about 10 minutes at which time action ceased. No further change was visible in 3 hours.

In 8, 10, 12, and 13 no change took place in 3 hours, the bentonite appearing the same granular size of $\frac{1}{16}$ to $\frac{3}{32}$ inch that it originally was. In 10 the aqueous solution used contained the same percentages of water soluble alkali metal carboxymethylcellulose and of sodium chloride as the aqueous mixture used in the "water soluble Alkali metal carboxymethylcellulose restored salted mud" of Example A and the clay protecting solution of beaker 4 of Example C above.

EXAMPLE E

A solution of 4 pounds of sodium carboxymethylcellulose in water was mixed with greater than the usual maximum proportions of caustic soda, phosphates (commercially sold as "Calgon") and/or quebracho as used in starch drilling mud and no chemical changes were observed. The tests were made with both one and two chemicals added to the solution.

The above simple experiments are merely representative and are given to show how water soluble alkali metal carboxymethylcellulose may be used in water base drilling muds by those skilled in the art of water base drilling muds.

It is to be understood that while a theory of operation has been advanced, it is not the only or necessary one, but has only been advanced to facilitate the disclosure. It is understood, however, that this invention is not limited to any theory of operation or action. It is further obvious that various changes may be made in the details without departing from the spirit of this invention, nor from the scope of the invention as defined in the following claims. It is to be understood the invention is not to be limited to the specific details described. For example calcium salts may form a white haze of colloidal nature in the solution and the solution will still be substantially a water soluble alkali metal carboxymethylcellulose. For example the tests with treating and control agents under Example E indicate that water soluble alkali metal carboxymethylcelluloses are somewhat inert chemically and that all the treating and control agents of the well drilling fluid and well controlling fluid arts may, after a simple test for solubility and lack of obvious adverse reaction be employed without invention in my water soluble alkali metal carboxymethylcellulose drilling and controlling fluids, and that with few if any exceptions they will be so employable. My invention is therefore to be defined by the following claims.

Having described my invention, I claim:

1. In a process of drilling wells comprising the steps of drilling the well with well drilling tools, and circulating through the well during said drilling a water base drilling mud which forms a filter cake on the wall of the well, the improvement comprising incorporating in said drilling mud a water soluble alkali metal carboxymethylcellulose in an amount sufficient to reduce the water loss due to filtration through said filter cake but insufficient to increase the viscosity of said drilling mud to such an extent that it cannot be circulated.

2. In a process of drilling wells comprising the steps of drilling the well with well drilling tools, and circulating through the well during said drilling a water base drilling mud which forms a filter cake on the wall of the well, the improvement comprising incorporating in said drilling mud a water soluble sodium carboxymethylcellulose in an amount sufficient to reduce the water loss due to filtration through said filter cake but insufficient to increase the viscosity of said drilling mud to such an extent that it cannot be circulated.

3. In a process of drilling wells comprising the steps of drilling the well with well drilling tools, and circulating through the well during said drilling a water base drilling mud which forms a filter cake on the wall of the well, the improvement comprising incorporating in said drilling mud a water soluble potassium carboxymethylcellulose in an amount sufficient to reduce the water loss due to filtration through said filter cake but insufficient to increase the viscosity of said drilling mud to such an extent that it cannot be circulated.

4. In a process of drilling wells comprising the steps of drilling the well with well drilling tools, and circulating through the well during said drilling a water base drilling mud which forms a filter cake on the wall of the well, the improvement comprising incorporating in said drilling mud a water soluble lithium carboxymethylcellulose in an amount sufficient to reduce the water loss due to filtration through said filter cake but insufficient to increase the viscosity of said drilling mud to such an extent that it cannot be circulated.

5. A water base well drilling mud comprising in combination sufficient water to maintain the mud as a fluid, sufficient clayey material to form a filter cake on the wall of the well, and a water soluble alkali metal carboxymethylcellulose in an amount sufficient to reduce the water loss due to filtration through said filter cake without increasing the viscosity of said well drilling mud to such an extent that it cannot be circulated.

6. A water base well drilling mud comprising in combination sufficient water to maintain the mud as a fluid, sufficient clayey material to form a filter cake on the wall of the well, and a water soluble sodium carboxymethylcellulose in an amount sufficient to reduce the water loss due to filtration through said filter cake without increasing the viscosity of said well drilling mud to such an extent that it cannot be circulated.

7. A water base well drilling mud comprising in combination sufficient water to maintain the mud as a fluid, sufficient clayey material to form a filter cake on the wall of the well, and a water soluble potassium carboxymethylcellulose in an amount sufficient to reduce the water loss due to filtration through said filter cake without increasing the viscosity of said well drilling mud to such an extent that it cannot be circulated.

8. A water base well drilling mud comprising in combination sufficient water to maintain the mud as a fluid, sufficient clayey material to form a filter cake on the wall of the well, and a water soluble lithium carboxymethylcellulose in an amount sufficient to reduce the water loss due to filtration through said filter cake without increasing the viscosity of said well drilling mud to such an extent that it cannot be circulated.

9. A water base well drilling mud comprising an aqueous fluid mixture containing suspended solids which form a filter cake on the wall of the well, and a water soluble alkali metal carboxymethylcellulose in an amount sufficient to reduce the water loss due to filtration through said filter cake without increasing the viscosity of said well drilling mud to such an extent that it cannot be circulated.

10. A water base well drilling mud comprising an aqueous fluid mixture containing suspended solids which form a filter cake on the wall of the well, and a water soluble sodium carboxymethylcellulose in an amount sufficient to reduce the water loss due to filtration through said filter cake without increasing the viscosity of said well drilling mud to such an extent that it cannot be circulated.

11. A water base well drilling mud comprising an aqueous fluid mixture containing suspended solids which form a filter cake on the wall of the well, and a water soluble potassium carboxymethylcellulose in an amount sufficient to reduce the water loss due to filtration through said filter cake without increasing the viscosity of said well drilling mud to such an extent that it cannot be circulated.

12. A water base well drilling mud comprising an aqueous fluid mixture containing suspended solids which form a filter cake on the wall of the well, and a water soluble lithium carboxymethylcellulose in an amount sufficient to reduce the water loss due to filtration through said filter cake without increasing the viscosity of said well drilling mud to such an extent that it cannot be circulated.

CARY R. WAGNER.

REFERENCES CITED

The following references are of record in the file of this patent:

UNITED STATES PATENTS

| Number | Name | Date |
|---|---|---|
| 2,073,413 | Cross et al. I | Mar. 9, 1937 |
| 2,129,913 | Cross et al. II | Sept. 13, 1938 |
| 2,336,171 | Freeland et al. | Dec. 7, 1943 |
| 2,337,296 | Kennedy et al. | Dec. 21, 1943 |
| 2,360,327 | Bailey et al. | Oct. 17, 1944 |
| 2,364,434 | Foster | Dec. 5, 1944 |
| 2,180,152 | Kohler | Nov. 14, 1939 |

FOREIGN PATENTS

| Number | Country | Date |
|---|---|---|
| 705,171 | Germany | Apr. 19, 1941 |

OTHER REFERENCES

Davis, The Swelling of Bentonite and Its Control, Article in Industrial and Engineering Chemistry, vol. 19, pp. 1350–1352 Dec. 1927.

Halbouty et al., Article in The Oil Weekly, Oct. 31, 1938, pp. 42, 48, 50, 52 and 54.

British Plastics, Aug. 1943, pp. 168, 169, and 170.

Sodium Carboxymethylcellulose, pamphlet pub. by Hercules Powder Co., June 1944, page 4.

Bryant, Use of Thorium Nitrate to Distinguish Between Pectin and Certain Gums, Article in Industrial and Engineering Chemistry, vol. 13, page 103, Feb. 15, 1941.